US011514921B2

(12) United States Patent
George et al.

(10) Patent No.: US 11,514,921 B2
(45) Date of Patent: Nov. 29, 2022

(54) AUDIO RETURN CHANNEL DATA LOOPBACK

(71) Applicant: Apple Inc., Cupertino, CA (US)

(72) Inventors: Brett D. George, Los Altos, CA (US); Adam E. Kriegel, Mountain View, CA (US); Michael F. Jean, San Francisco, CA (US); Daniel C. Klingler, Sunnyvale, CA (US); Girault W. Jones, Los Gatos, CA (US); Felipe Ferreri Tonello, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 330 days.

(21) Appl. No.: 16/584,008

(22) Filed: Sep. 26, 2019

(65) Prior Publication Data

US 2021/0098011 A1    Apr. 1, 2021

(51) Int. Cl.
G10L 19/16    (2013.01)

(52) U.S. Cl.
CPC .................................. *G10L 19/167* (2013.01)

(58) Field of Classification Search
CPC ............................ G10L 19/032; G10L 19/167
See application file for complete search history.

(56) References Cited

U.S. PATENT DOCUMENTS

| 6,295,009 | B1 * | 9/2001 | Goto | ...................... | G10L 19/035 |
| | | | | | 341/50 |
| 6,587,823 | B1 * | 7/2003 | Kang | ...................... | G10L 19/018 |
| | | | | | 704/275 |
| 8,639,369 | B1 * | 1/2014 | Clark | ...................... | G10L 25/69 |
| | | | | | 700/94 |
| 11,107,481 | B2 * | 8/2021 | Ullmann | ............. | G10L 19/0212 |
| 2003/0002609 | A1 * | 1/2003 | Faller | .................... | G10L 19/167 |
| | | | | | 375/372 |

(Continued)

FOREIGN PATENT DOCUMENTS

KR    20150081070 A    *    7/2015

OTHER PUBLICATIONS

Borges, Daniel R., et al., U.S. Appl. No. 62/716,824, filed Aug. 9, 2018.

(Continued)

*Primary Examiner* — Anne L Thomas-Homescu
(74) *Attorney, Agent, or Firm* — Womble Bond Dickinson (US) LLP (57) ABSTRACT

A system and method to process audio data received over the ARC or eARC interface of HDMI from audio sources are provided. A media device may receive compressed audio data in a number of data formats. The media device may convert between the audio formats provided by the audio sources and the audio formats supported by audio playback devices. The media device may inspect frames of audio data to determine if the frames are to be decoded. The frame may be decoded and subsequently encoded into the data formats supported by the audio playback devices. To reduce latency, the media device may enable a pass-through mode to bypass the decoding of the frames to allow the frames to be decoded at the audio playback devices. A bi-directional loopback application may route audio data received over the ARC or eARC interface from the audio sources to the audio playback devices.

20 Claims, 5 Drawing Sheets

(56) References Cited

U.S. PATENT DOCUMENTS

| | | | | |
|---|---|---|---|---|
| 2004/0174899 | A1* | 9/2004 | Rambo | G10L 19/00 |
| | | | | 370/465 |
| 2008/0008281 | A1* | 1/2008 | Abrol | H04N 21/4307 |
| | | | | 375/359 |
| 2012/0243710 | A1* | 9/2012 | Chau | G10L 19/005 |
| | | | | 381/119 |
| 2012/0287344 | A1* | 11/2012 | Choi | H04N 5/265 |
| | | | | 348/705 |
| 2015/0081070 | A1* | 3/2015 | Hwang | G06F 16/60 |
| | | | | 700/94 |
| 2016/0019021 | A1* | 1/2016 | Lu | G06F 3/0664 |
| | | | | 700/94 |
| 2016/0125888 | A1* | 5/2016 | Purnhagen | H04S 5/00 |
| | | | | 381/23 |
| 2018/0109896 | A1* | 4/2018 | Chebiyyam | H04S 3/008 |
| 2018/0166088 | A1* | 6/2018 | Duewer | G10L 19/167 |
| 2019/0013028 | A1* | 1/2019 | Atti | G10L 19/02 |
| 2019/0222938 | A1* | 7/2019 | Silverio | H04N 21/8106 |
| 2019/0349662 | A1* | 11/2019 | Lindahl | G06F 3/167 |
| 2020/0089464 | A1* | 3/2020 | Curtis | G06F 16/635 |
| 2020/0091959 | A1* | 3/2020 | Curtis | H04N 21/4307 |
| 2020/0402521 | A1* | 12/2020 | Olivieri | G10L 19/24 |
| 2021/0050022 | A1* | 2/2021 | Kjoerling | G10L 19/008 |

OTHER PUBLICATIONS

Notice of Allowance dated Jan. 22, 2021 for U.S. Appl. No. 16/584,012.

* cited by examiner

AUDIO RETURN CHANNEL DATA LOOPBACK

FIELD

This disclosure relates to the field of systems for communicating audio signals; and more specifically, to systems designed to process audio signals received over high-definition multimedia interface (HDMI) audio return channel (ARC) or enhanced ARC (eARC) for low latency wireless or wired transfer of the audio signals to audio devices. Other aspects are also described.

BACKGROUND

HDMI is a digital audio/video interface that is used for transmitting audio and video data between media devices, such as Blu-ray disc players, game consoles, audio/video receivers (AVR), sound bars, digital televisions, computer monitors, etc. For example, users may connect a Blu-ray disc player through an HDMI cable to an AVR and connect the AVR to a digital television through another HDMI cable to play the video from the Blue-ray disc on the television and the audio from the Blue-ray disc on the AVR. ARC is a feature of the HDMI that uses the single HDMI connection between the television and the AVR to send audio from the television back to the AVR when the television is the source of the audio, such as when the television is playing audio through an Internet app or has an audio source device connected directly to it. HDMI version 2.1 introduces an enhanced version of ARC, eARC that has a higher bandwidth to handle the higher throughput of newer audio formats. Audio data received over an ARC or eARC interface may be multiplexed from multiple audio sources of various audio formats. Switching between multiple audio sources may introduce discontinuities in the multiplexed audio data.

SUMMARY

A digital media device such as an Apple TV may be connected to a television through HDMI with the ARC or eARC interface that enables audio data sourced by the television to be transmitted to the media device. The media device may process the audio data for streaming via wired or wireless transmissions to audio playback devices such as a sound bar or earphones. The audio data sourced by the television may be received from multiple sources such as the Internet or one or more audio/video devices, for example Blu-ray disc players, connected to the television. The audio data are normally accompanied by sampling clocks for use by the media device to sample the audio data. However, when switching between the streaming audio data sources, temporary loss or discontinuities in the sampling clocks may occur, resulting in discontinuities in the sampled audio data provided to the audio playback devices. The result may be popping sounds from the audio playback devices, causing a discernible degradation in the user's listening experience.

It is desirable for the media device to mitigate the temporary loss of the sampling clocks when receiving audio data over the ARC or eARC interface. In one embodiment, the media device may substitute an externally generated clock derived from a local crystal oscillator of the media device for the missing sampling clock input. The media device may synchronize the externally generated clock, also referred to as an external clock, to the audio data when there is a loss of the input sampling clock. When the input sampling clock of the audio data reappears, the media device may switch back to the input sampling clock. When transitioning between the input sampling clock and the external clock, the media device may insert zero padding into the audio data samples to mute any potential glitch in the sound from the audio playback devices. In one embodiment, the media device may buffer the audio data and may bypass the audio data around the time of a clock transition when reading out the buffered audio data for processing.

Audio data may be received by the media device over the ARC or eARC interface as uncompressed pulse-code modulation (PCM) audio data or as compressed data in a number of lossy formats such as MP3, Advanced Audio Coding (AAC), Dolby Digital, Digital Theater Systems (DTS), or their lossless versions. The media device may transmit the audio data to the audio playback devices over different wireless protocols such as Bluetooth and WiFi and with various compression formats. The media device may handle the format conversion between the audio format provided by the audio sources and the audio format supported by the audio playback devices. In one embodiment, an audio driver may inspect frames of audio data to determine if the frames of audio data are to be decompressed. A frame of compressed audio data received in one compression format may be decompressed, also referred to as decoded, into PCM and subsequently encoded into a different compression format for transmission to an audio playback device. For audio frames that are received as uncompressed PCM data, the decoding process may be bypassed. In one embodiment, to reduce the source-to-endpoint latency, frames of compressed data may bypass decoding by the media device in a pass-through mode that allows the compressed data frames to be decoded at the audio playback device. The cost of the pass-through mode is that the media device or the audio playback device may not be able to support audio features such as fading, ducking, mixing, etc., of the compressed data frames. However, the pass-through mode allows a user the flexibility to perform a tradeoff between reduced latency and support for audio features at the media device.

In one embodiment, the media device may provide a bi-directional loopback application between one or more audio sources and one or more audio playback devices. The loopback application may route audio data received over the ARC or eARC interface from one of the audio sources to one of the audio playback devices and may configure the media device to perform audio processing functions such as format conversion, audio session interruption, ducking, etc. The loopback function may also route audio data received from a microphone of an audio playback device to an audio source device or another device on the other side of the HDMI connection, such as routing audio data from a smartphone to the television to which the audio sources are attached. In one embodiment, the loopback function may route audio data from an audio playback device to another audio playback device on the same side of the HDMI connection. In one embodiment, the loopback function may provide media commands, such as play, pause, etc., to the audio sources.

A system and method for generating output audio data streams for audio endpoints is disclosed. The system performs a method that includes receiving from an audio source an encoded input audio data stream containing encoded audio data. The method includes determining whether to decode the encoded input audio data stream. If it is determined to decode the encoded input audio data stream, the method further includes decoding the encoded audio data to generate a decoded audio data stream containing decoded audio data. The method further includes looping back the encoded audio data of the encoded input audio data stream or the decoded audio data of the decoded audio data stream to generate the output audio data streams. The output audio data streams contain audio data that are encoded in the audio formats supported by the audio endpoints.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

When receiving time multiplexed audio data from multiple audio sources through HDMI with ARC or eARC, there may be temporary loss or discontinuities of the sampling clocks that accompany the audio data. This may happen when a user switches between the audio data from different sources. To mitigate the discontinuities in the input sampling clock and the sampled audio data, a media device may detect for such conditions to substitute an externally generated clock derived from a local crystal oscillator of the media device for the missing input sampling clock. In one embodiment, the externally generated clock may be synchronized to the frequency of the input sampling clock. When the input sampling clock disappears, the media device may switch in the externally generated clock to preserve the frequency of the missing input sampling clock. In one embodiment, audio data from different audio sources may have different input sampling clock frequencies. When audio data selected by the user is missing the corresponding input sampling clock, the media device may switch in the externally generated clock synchronized to the frequency of the corresponding input sampling clock. When the input sampling clock reappears, the media device may switch from using the externally generated clock back to the reappearing input sampling clock. In one embodiment, the media device may mute some audio data around the time of the clock switching to reduce degradation in the sound quality from an audio playback device.

The media device may sample the audio data using the input sampling clock or the externally generated clock and may process the sampled audio data. The media device may convert the audio compression format of the sampled audio data to the format supported by the audio playback device. To provide the flexibility to reduce the processing latency associated with decoding frames of audio data of one compression format and encoding the decoded frames into another compression format, the media device may bypass the decoding by transmitting the frames of audio data to the audio playback device for the audio playback device to perform the decoding. A bi-directional loopback function may route audio data received over the eARC interface from one or more audio sources to one or more audio playback devices. The bi-directional loopback function may configure the media device to perform format conversion, audio mixing, audio session interrupts, fading, ducking, etc., of the audio data and may configure session information for the audio data.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

Figure 1:
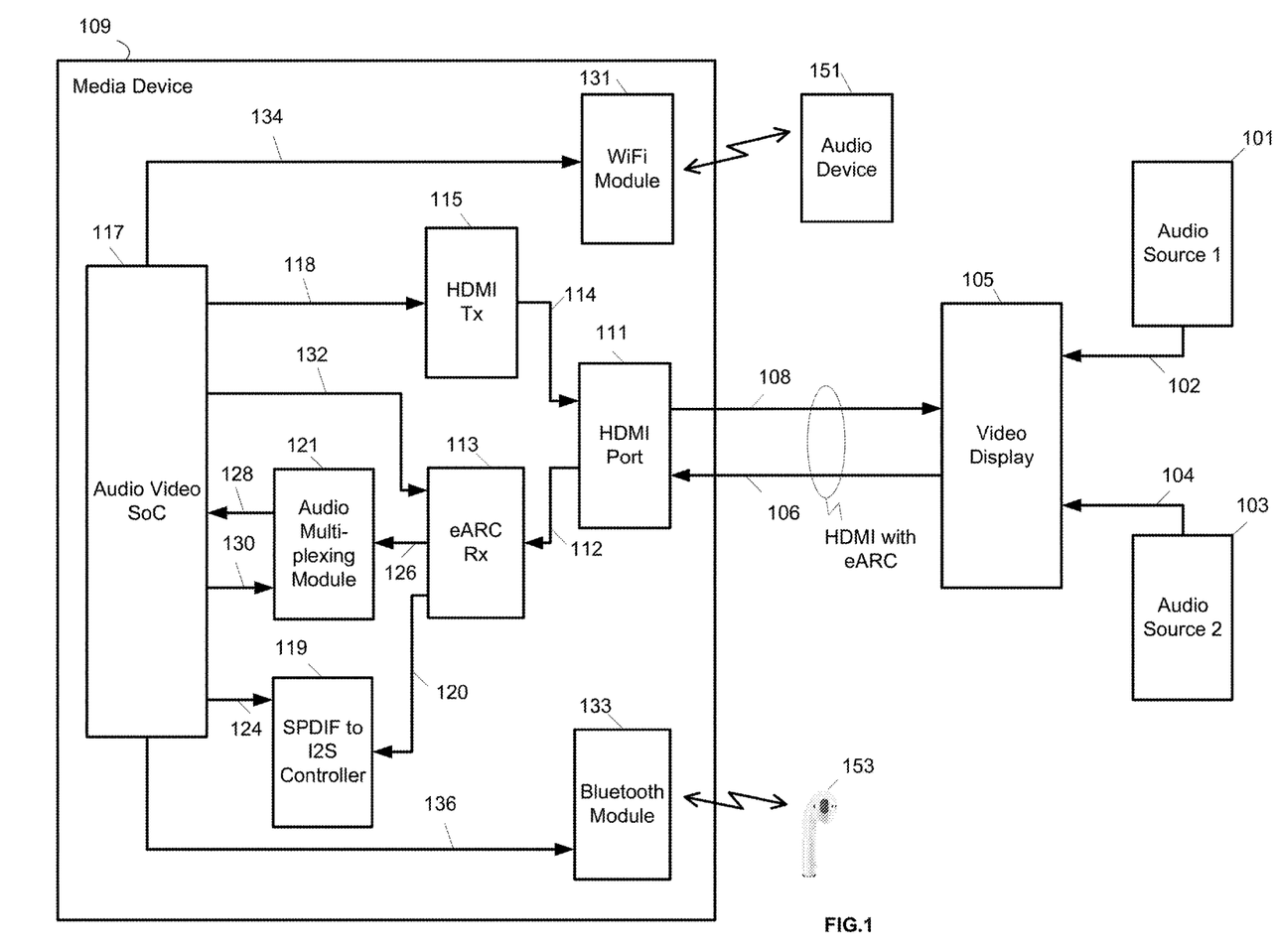
FIG. 1 is a hardware architectural diagram of a media device configured to receive audio data from audio sources over HDMI with eARC interface and to process the audio data for transmission to audio playback devices according to one embodiment of the disclosure.

FIG. 1 is a hardware architectural diagram of a media device configured to receive audio data from audio sources over HDMI with eARC interface and to process the audio data for transmission to audio playback devices according to one embodiment of the disclosure. The HDMI with eARC interface allows an audio/video playback device that consumes video and audio information received over the HDMI to act as an audio source by transmitting audio data on the eARC interface of the same HDMI connection.

For example, a video display 105 such as a television may receive video and audio information from a media device 109 over the HDMI 108. Media device 109 may be an AVR that streams content from a Blu-ray disc player or a media streaming device that runs an application to stream content from the Internet. Two audio sources 101 and 103 may be connected to the video display 105. Audio sources 101 or 103 may source audio data for playback on the video display 105 or on devices connected to the media device, such as an audio device 151 or earphones 153. For example, audio sources 101 or 103 may be an antenna receiving music from an over-the-air broadcast channel, an application streaming music from the Internet, a Blu-ray disc player playing music, etc. Audio sources 101 and 103 are connected to the video display 105 through connections 102 and 104, respectively. Connections 102 and 104 may be HDMI cables or other types of wired or wireless connections. Video display 105 may relay the audio data from audio sources 101 or 103 to media device 109 through the eARC interface 106. In one embodiment, video display 105 may time multiplex the audio data from audio sources 101 and 103.

The audio data transmitted on the eARC interface 106 may be in the format of SPDIF digital audio (Sony/Phillips digital interface for digital audio). The eARC interface 106 may be a differential signal that supports a maximum audio payload of 37 megabits per second, equivalent to eight channels of 192 KHz, 24-bit uncompressed PCM audio, which is the maximum audio bandwidth for Blu-ray. It is also equivalent to the audio bandwidth of a four-channel I²S (Inter IC Sound), allowing the eARC interface 106 to support the higher throughput of the newer compressed audio formats. A one megabit per second bi-directional data signal may be modulated on the eARC audio data to allow the video display 105 to receive information on the audio formats supported by the audio device 151 or earphones 153, or to monitor the status of the audio device 151 or earphones 153.

A HDMI port 111 of the media device 109 may receive the audio data over the eARC interface 106. The HDMI port 111 may provide the audio data over a connection 112 to an eARC receive (Rx) module 113. The eARC Rx module 113 may act as a bridge between the differential eARC signal and an interface for the SPDIF or I²S signals. For example, if the audio data of the differential eARC signal is SPDIF digital audio, the eARC Rx module 113 may transmit the SPDIF digital audio signal 120 to a SPDIF-to-I²S controller 119. SPDIF-to-I²S controller 119 may convert the SPDIF digital audio signal 120 to one or more channels of I²S signals 122 and may provide the I²S signals 122 to an audio multiplexing module 121. In one embodiment, SPDIF-to-I²S controller 119 may operate in the ARC mode. If the audio data of the differential eARC signal is four-channel I²S data, the eARC Rx module 113 may transmit the four-channel I²S audio signal 126 to the audio multiplexing module 121.

The audio multiplexing module 121 may receive the I²S audio signals 122 and 126, which may be audio signals generated by different audio sources, such as audio sources 101 and 103. In one embodiment, the I²S audio signals 122 and 126 may be different audio channels of the same audio source. The I²S audio signals 122 and 126 may be received with their respective sampling clocks used for sampling the audio signals. The audio multiplexing module 121 may time multiplex between the I²S audio signals 122, 126, and their respective sampling clocks when a user switches between the audio sources. When switching between audio signals 122 and 126, there may be a temporary loss or discontinuities in the sampling clocks, resulting in discontinuities in the sampled audio data. In one embodiment, if the video display 105 is configured to switch between audio data between audio sources 101 and 103, the audio data received over the eARC interface 106 may already be associated with discontinuities in the sampling clock.

To mitigate the discontinuities in the input sampling clock and the sampled audio data, the audio multiplexing module 121 may detect for such conditions to substitute an externally generated clock derived from a local crystal oscillator for the missing input sampling clock. The externally generated clock may be synchronized to the frequency of the input sampling clock associated with the I²S audio signals 122 or 126. When the input sampling clock disappears, the externally generated clock may continue to run at the frequency of the input sampling clock prior to its disappearance. In one embodiment, when the two input sampling clocks are at different frequencies, two externally generated clocks synchronized to the two different frequencies may be maintained. When a discontinuity in the input sampling clock associated with the I²S audio signals 122 or 126 is detected, the audio multiplexing module 121 may determine which audio signal has a discontinuous input sampling clock and may switch in the externally generated clock of the corresponding frequency. In one embodiment, when the input sampling clock reappears, the audio multiplexing module 121 may switch from using the externally generated clock back to the reappearing input sampling clock.

The substitution of the externally generated clock for the discontinuous input sampling clock minimizes the number of audio data samples without a sampling clock. Nevertheless, the clock transitioning process may not produce a continuous clock. In one embodiment, the audio multiplexing module 121 may mute some audio data samples around the time of the clock switching. For example, the data samples of the I²S audio signals 122 or 126 may be stored and read out in a circular buffer. When clock switching is performed, zero padding data may be written to the buffer to replace some of the data samples around the time of the clock switching so these data samples may be muted when read from the buffer. In one embodiment, zero padding data may be inserted into the stream of data samples around the time of the clock switching instead of replacing some of the data samples. In one embodiment, data samples around the time of the clock switching may be flushed or bypassed when read out from the buffer.

The audio multiplexing module 121 may output the multiplexed audio data samples and the switched sampling clock on connection 128 to an audio video system on chip (AV SoC) 117. In one embodiment, the audio multiplexing module 121 may output the audio signals of multiple audio sources or multiple channels accompanied by their associated sampling clocks to the AV SoC 117 for the AV SoC 117 to perform data switching and clock switching between the audio sources or channels. The AV SoC 117 may convert the format of the audio data samples to the format supported by the audio playback devices. For example, the audio data samples may be received in frames of uncompressed PCM data, or compressed audio data in one of various audio compression formats (e.g., MP3, AAC, Dolby Digital, DTS, or their lossless variants). The audio playback devices may support these and other formats such as AirPlay by Apple of Cupertino, Calif. In one embodiment, the audio playback devices may publish their supported audio formats to the AV SoC 117 when establishing their connections with the AV SoC 117. In one embodiment, the audio playback devices may publish their supported audio formats or their capabilities to the AV SoC 117.

In one embodiment, the AV SoC 117 may decode the frames of compressed audio data and encode the decoded audio data into one of the audio compression formats supported by the audio playback devices. By decoding the compressed audio data into decoded data, the AV SoC 117 may process the frames of decoded audio data from multiple audio sources or channels to perform audio functions such as mixing, audio session interrupt, fading, ducking, etc. In one embodiment, to reduce the audio processing latency from an audio source to an audio playback device, the AV SoC 117 may bypass the audio decoding and may transmit the frames of compressed audio data to the audio playback device for the audio playback device to perform the decoding. Carrying compressed audio data through the AV SoC 117 to the audio playback device may prevent the AV SoC 117 from performing some of the described audio functions, but affords a user the flexibility to trade off audio features for reduced latency. For example, the AV SoC 117 may evaluate whether the audio processing latency meets a latency target when determining whether to bypass the audio decoding. In one embodiment, the AV SoC 117 may evaluate the capabilities of the audio playback device, the audio format supported by the audio playback device, or the bandwidth available to transmit the audio data to the audio playback device when determining whether to bypass the audio decoding.

In one embodiment, the AV SoC 117 may decode the frames of compressed audio data and encode the decoded audio data into one of the audio compression formats supported by the audio playback devices. By decoding the compressed audio data into decoded data, the AV SoC 117 may process the frames of decoded audio data from multiple audio sources or channels to perform audio functions such as mixing, audio session interrupt, fading, ducking, etc. In one embodiment, to reduce the audio processing latency from an audio source to an audio playback device, the AV SoC 117 may bypass the audio decoding and may transmit the frames of compressed audio data to the audio playback device for the audio playback device to perform the decoding. Carrying compressed audio data through the AV SoC 117 to the audio playback device may prevent the AV SoC 117 from performing some of the described audio functions, but affords a user the flexibility to trade off audio features for reduced latency. For example, the AV SoC 117 may evaluate whether the audio processing latency meets a latency target when determining whether to bypass the audio decoding. In one embodiment, the AV SoC 117 may evaluate the capabilities of the audio playback device, the audio format supported by the audio playback device, or the bandwidth available to transmit the audio data to the audio playback device when determining whether to bypass the audio decoding.

In one embodiment, the AV SoC 117 may provide a bi-directional loopback function between the audio device 151 or earphones 153 and the video display 105. For example, the loopback function may route audio data received from a microphone of the audio device 151 or the earphone 153 to the video display 105 through the HDMI 106 for playback. The AV SoC 117 may convert the format of the audio data received from the audio device 151 or the earphone 153 to the format supported by the video display 105. In one embodiment, the AV SoC 117 may decode the frames of compressed audio data received from the audio device 151 or the earphone 153 to perform audio mixing, audio session interrupt, ducking, or fading of currently playing content, etc. The AV SoC 117 may forward the processed audio data to the HDMI Tx module 115 over the connection 118. The connection 118 may also be used to forward any video data sourced by a video device connected to the media device 109. The HDMI Tx module 115 may format the audio and video data into HDMI frames and may forward the HDMI frames to the HDMI port 111 for transmission over the HDMI connection 106 to the video display 105 for playback. In one embodiment, the audio data may be media commands (e.g., play, pause) spoken by a user into the audio device 151 or earphones 153 to control the operation of the video display 105.

The AV SoC 117 may control the eARC Rx module 113 and the SPDIF-to-I$^2$S controller 119 through control interface 132 and 124, respectively. For example, the AV SoC 117 may use the control interface 132 to configure a master clock and the sampling rate used by the eARC Rx module 113 for sampling the differential eARC signal, to configure a bridge for the bi-directional data signal modulated on the eARC audio data, and to control the state of operation of the eARC Rx module 113. The AV SoC 117 may use the control interface 124 to power on and off and to configure the SPDIF-to-I$^2$S controller 119. In one embodiment, the control interface 132 and 124 may be an I2C (Inter-Integrated Circuit) serial interface. The AV SoC 117 may also control clock switching operation of the audio multiplexing module 121 through a control interface 130. In one embodiment, the control interface 130 may be an SPI (Serial to Peripheral Interface).

Figure 2:
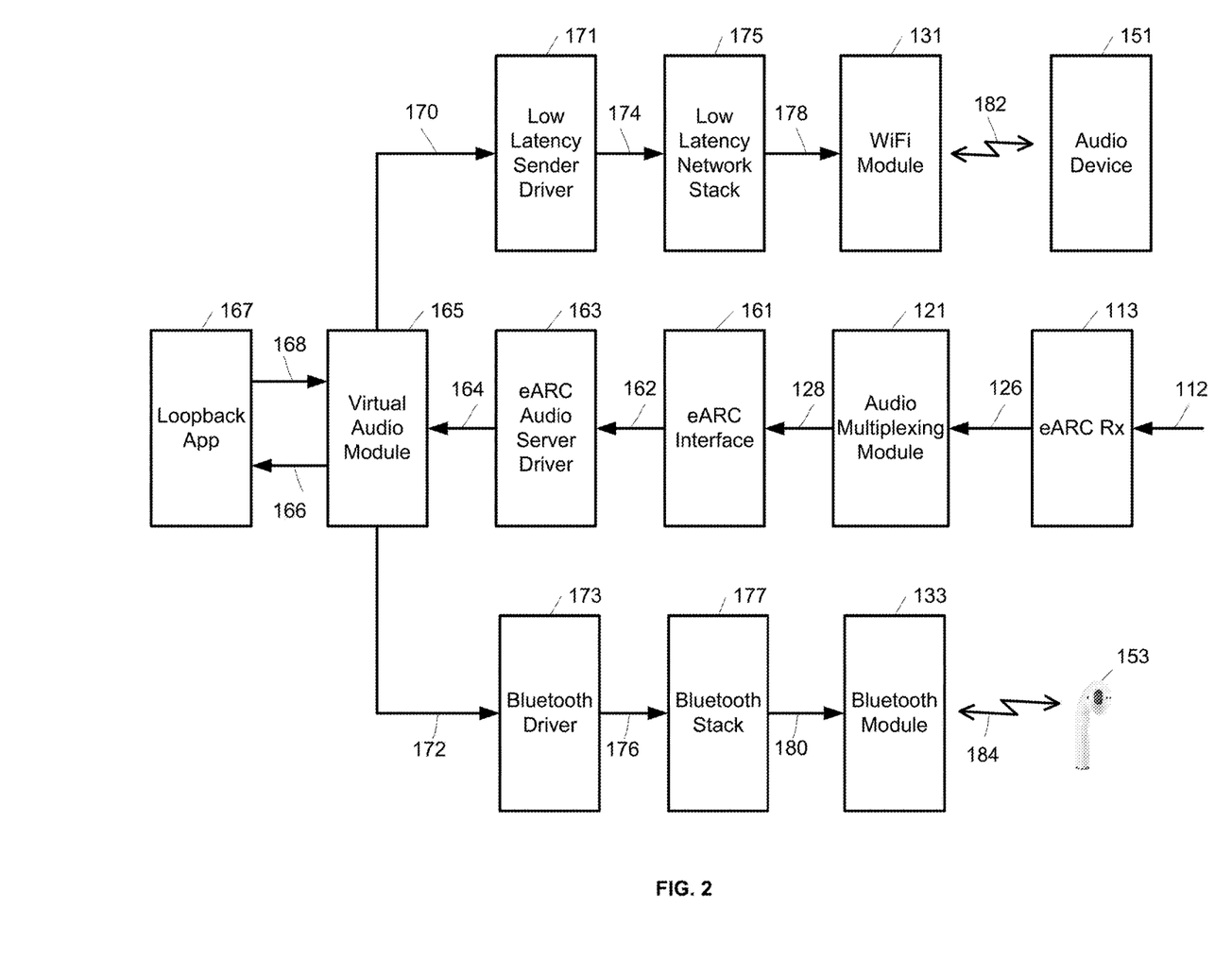
FIG. 2 is a software architectural diagram illustrating the processing flow of audio data from the reception of the audio data by a media device over HDMI with eARC interface to the transmission of the audio data to audio playback devices according to one embodiment of the disclosure.

FIG. 2 is a software architectural diagram illustrating the processing flow of audio data from the reception of the audio data by a media device over HDMI with eARC interface to the transmission of the audio data to audio playback devices according to one embodiment of the disclosure. The eARC Rx module 113 may act as a bridge between audio data received over the connection 112 from the eARC interface and the audio multiplexing module 121. In one embodiment, the eARC Rx module 113 may provide the audio data as four-channel I$^2$S data 126 to the audio multiplexing module 121. The audio multiplexing module 121 may perform time multiplexing of the audio data and clock switching between an externally generated clock and one or more input sampling clocks of the audio data when there are discontinuities in the input sampling clocks. Operations of the audio multiplexing module 121 have been described in conjunction with FIG. 1 and will not be repeated for the sake of brevity.

An eARC interface module 161 may be part of the kernel space to sample the time multiplexed audio data using the clock received from the audio multiplexing module 121. In one embodiment, the eARC interface module 161 may receive the audio signals of multiple audio sources or multiple channels accompanied by their associated sampling clocks for the eARC interface module 161 to perform time multiplexing of the audio data and the clock switching. The eARC interface module 161 may perform direct memory access (DMA) to a memory to write and read the sampled audio data. In one embodiment, the eARC interface module 161 may mute some of the sampled audio data around the time of clock switching by inserting zero padding data, replacing the sampled audio data with zero padding data, flushing the sampled audio data, bypass reading the sampled audio data, reducing the gain of the sampled audio data, etc.

An eARC audio sever driver 163 may receive frames of sampled audio data 162 from the eARC interface module 161. The eARC audio server driver 163 may inspect the header of the audio data frames 162 to determine the data format of the frames and to convert the data format to one supported by the audio playback devices. In one embodiment, if the data format supported by an audio playback device is different from the data format of a frame, the eARC audio server driver 163 may decode the data format of the frame into PCM data and may encode the PCM data into the data format supported by the audio playback device. The eARC audio server driver 163 may feed the decoder with the correct frame size or block size of compressed audio data needed for the decoding.

In one embodiment, if the data format of the frame is supported by the audio playback device, the eARC audio server driver 163 may bypass the decoding process in a pass-through mode to allow the audio playback device to decode the frame. The pass-through mode may reduce the latency of the audio data from the audio source to the audio playback device. However, carrying frames of compressed audio data 162 through the processing pipeline may make some audio features non-operational. For example, mixing, fading, ducking, etc., of the audio data in the compressed frames with the PCM data from decoded frames of other audio sources or channels may be restricted. In one embodiment, the eARC audio server driver 163 may evaluate the capabilities of the audio playback device, the audio format supported by the audio playback device, or the bandwidth available to transmit the audio data to the audio playback device when determining whether to enable the pass-through mode. In one embodiment, in the pass-through mode, the eARC audio server driver 163 may synchronize the compressed data in the frame to a media clock. In one embodiment, if the audio data in a frame is in PCM, no decoding is necessary and the eARC audio sever driver 163 may encode the PCM data into the data format supported by the audio playback device.

In one embodiment, the eARC audio server driver 163 may receive frames of audio data from an audio playback device, such as a microphone of a smartphone, headphones, a virtual assistant device, etc., to convert the data format of the frames to a data format supported by a device on the other end of the HDMI connection or to a data format supported by another audio playback device on the same end of the HDMI connection as the first audio playback device. The eARC may also perform a tradeoff between reduced latency and support of enhanced audio features to determine whether to bypass decoding of the frames of compressed audio data in the pass-through mode.

A virtual audio module 165 may receive the frames of audio data 164 from the eARC audio server driver 163. The virtual audio module 165 may be configured to process the frames of decoded audio data from multiple audio sources or multiple channels to generate the audio data for various audio playback devices. For example, while a user listens on headphones to the audio channel of a multi-media content provided through the HDMI eARC interface, a virtual assistant response in response to a query from the user may be provided through the same HDMI eARC interface from a virtual assistant device. The virtual audio module 165 may mix the audio channel of the multi-media content with the virtual assistant response in a barge-in ducking process to bring the audio for the virtual assistant response to the foreground while fading the audio of the multi-media content to the background. In one embodiment, the virtual audio module 165 may mix audio data from multiple channels to generate stereo or multi-channel audio for the audio playback devices. In one embodiment, the virtual audio module 165 may encode frames of audio data into the data format supported by the audio playback devices and may provide the encoded audio frames to a low latency sender driver 171 and a Bluetooth driver 173 through connections 170 and 172, respectively.

A bi-directional loopback application 167 may route audio data received over the eARC interface from an audio source to one of the audio playback devices. The loopback application 167 may configure the eARC audio server driver 163 to perform format conversion or may configure the virtual audio module 165 to perform audio mixing, audio session interrupts, fading, ducking, etc. For example, the loopback function 167 may receive a stream of decoded audio data 166 from the virtual audio module 165 and may route the stream back to the virtual audio module 165 to encode the audio data into a format supported by an audio playback device. In one embodiment, the loopback function 167 may configure the session information for the audio data, such as whether the audio data is music, game play, or other categories. In one embodiment, the loopback function 167 may loopback frames of compressed audio data that changes between encoding formats. The loopback function 167 may mute a portion of the output data streams looped back from the frames of compressed audio data or frames of decoded data when the encoding formats change. The loopback function 167 may also route audio date received from an audio playback device, such as a microphone of the audio device 151, to a device over the HDMI connection, or to another audio playback device, such as earphones 153. In one embodiment, the loopback function may provide media commands, such as play, pause, etc., to an audio source over the HDMI eARC interface.

The low latency sender driver 171 may process the audio data for the audio device 151 received from the virtual audio module 165. In one embodiment, the low latency sender driver 171 may encode frames of decoded audio data into a format supported by the audio device 151. A low latency network stack 175 may receive frames of audio data 174 from the low latency sender driver 171 to perform low level audio stack operation such as encapsulating the audio data into packets of a peer-to-peer protocol. The WiFi module 131 may receive the audio data 178 from the low latency network stack 175 to perform media access control (MAC) and physical (PHY) layer operations to transmit the audio data using the peer-to-peer protocol over the WiFi link 182 to the audio device 151.

Analogously, the Bluetooth driver 173 may process the audio data for the earphones 153 received from the virtual audio module 165. In one embodiment, the Bluetooth driver 173 may encode frames of decoded audio data into a format supported by the earphones 153. A Bluetooth stack 177 may receive frames of audio data 176 from the Bluetooth driver 173 to perform low level audio stack operation to make data packets that are compliant with a peer-to-peer protocol. The Bluetooth module 133 may receive the audio data 180 from the Bluetooth stack 177 to perform MAC and PHY layer operations to transmit the audio data using the peer-to-peer protocol over the Bluetooth link 184 to the earphones 153.

The low latency sender driver 171, Bluetooth driver 173, and the eARC audio server driver 163 may form part of the device driver. The low latency network stack 173, Bluetooth stack 177, and the eARC interface 161 may form part of the kernel space. The virtual audio module 165 and the loopback application 167 may form part of the user space application. The kernel space, device driver, and the user space application may form part of the software executed by a processor of the AV SoC 117 of FIG. 1.

Figure 3:
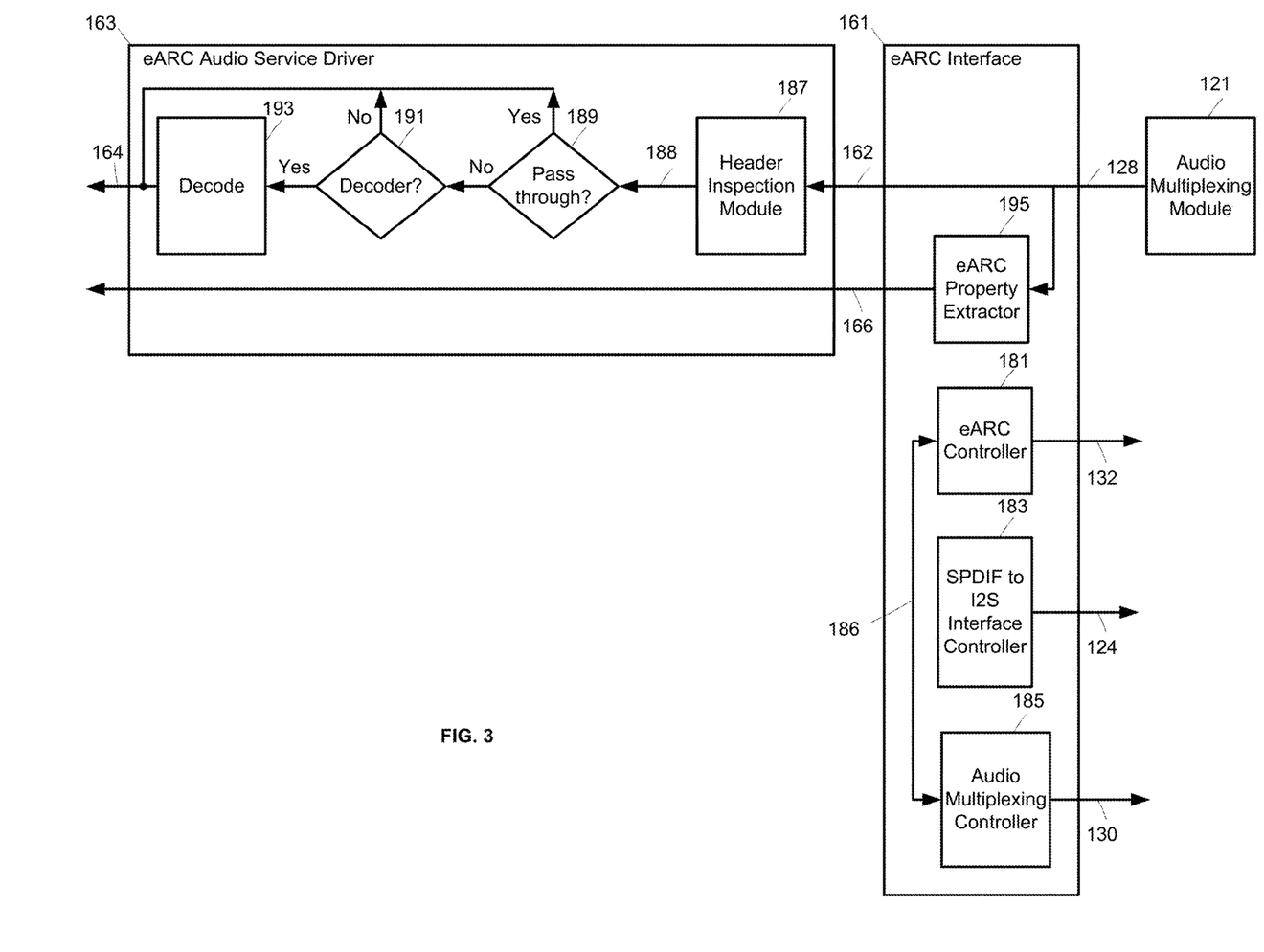
FIG. 3 depicts a software architectural diagram illustrating the processing of audio data received over HDMI with eARC interface for clock switching and data decoding according to one embodiment of the disclosure.

FIG. 3 depicts a software architectural diagram illustrating the processing of audio data received over HDMI with eARC interface for clock switching and data decoding according to one embodiment of the disclosure. The audio multiplexing module 121 may perform time multiplexing of the audio data and clock switching between an externally generated clock and one or more input sampling clocks of the audio data when there are discontinuities in the input sampling clocks. Operations of the audio multiplexing module 121 have been described in conjunction with FIG. 1 and FIG. 2 and will not be repeated for the sake of brevity.

The eARC interface module 161 may include an eARC property extractor module 195, an eARC controller 181, a SPDIF-to-I$^2$S interface controller 183, and an audio multiplexing controller 185. The eARC property extractor module 195 may extract property information 166 of the frames of the audio data received from the audio multiplexing module 121. In one embodiment, the property information 166 may include information on the source of the audio data. The eARC controller 181 may configure and control the eARC Rx module 113 of FIG. 1 and FIG. 2 through the control interface 132. In one embodiment, the eARC controller 181 may use the control interface 132 to configure a master clock and the sampling rate used by the eARC Rx module 113 for sampling the differential eARC signal, to configure a bridge for the bi-directional data signal modulated on the eARC audio data, and to control the state of operation of the eARC Rx module 113.

The SPDIF-to-I$^2$S interface controller 183 may configure and control the SPDIF-to-I$^2$S controller 119 of FIG. 1 through the control interface 124. In one embodiment, the SPDIF-to-I$^2$S interface controller 183 may use the control interface 124 to power on and off the SPDIF-to-I$^2$S controller 119. In one embodiment, the control interface 132 and 124 may be an I2C interface. The audio multiplexing controller 185 may configure and control the audio multiplexing module 121 of FIG. 1 and FIG. 2 through the control interface 130. In one embodiment, the audio multiplexing controller 185 may use the control interface 130 to control the clock switching operation of the audio multiplexing module 121. In one embodiment, the control interface 130 may be an SPI interface.

A header inspection module 187 of the eARC audio service driver 163 may inspect the header of the audio data frames 162 from the eARC interface module 161 to determine the data format of the frames and to convert the data format to one supported by an audio playback device. The header inspection module 187 may strip the header from the audio data frames 162 to pass the audio data payload 188. If the data format of a frame is supported by the audio play device, the eARC audio server driver 163 may determine whether to bypass the decoding process in a pass-through mode at operation 189 to allow the audio playback device to decode the frame. The pass-through mode may allow a reduction in the latency of the audio data from the audio source to the audio playback device. However, carrying compressed audio data 188 through the processing pipeline may make some audio features non-operational. In one embodiment, the eARC audio server driver 163 may evaluate the capabilities of the audio playback device, the audio format supported by the audio playback device, or the bandwidth available to transmit the audio data to the audio playback device when determining whether to enable the pass-through mode. If the pass-through mode is desired, the eARC audio server driver 163 may pass the compressed audio data 188 to the output as frames of audio data 164. In one embodiment, in the pass-through mode, the eARC audio server driver 163 may synchronize the compressed audio data 188 to a media clock. In one embodiment, the media clock may be associated with the compressed audio data 188.

If the pass-through mode is not desired or if the data format of the frame is not supported by the audio playback, the eARC audio server driver 163 may determine whether to decode the audio data at operation 191. If the audio data in the frame is in PCM, no decoding is necessary and the eARC audio server driver 163 may pass the uncompressed audio data 188 to the output as frames of audio data 164. If decoding is desired, the eARC audio server driver 163 may decode the compressed audio data in accordance with the determined data format of the frame into PCM data and may pass the decoded audio data to the output as frames of audio data 164. The eARC audio server driver 163 may feed the decoder with the correct frame size or block size of compressed audio data needed for the decoding.

Figure 4:
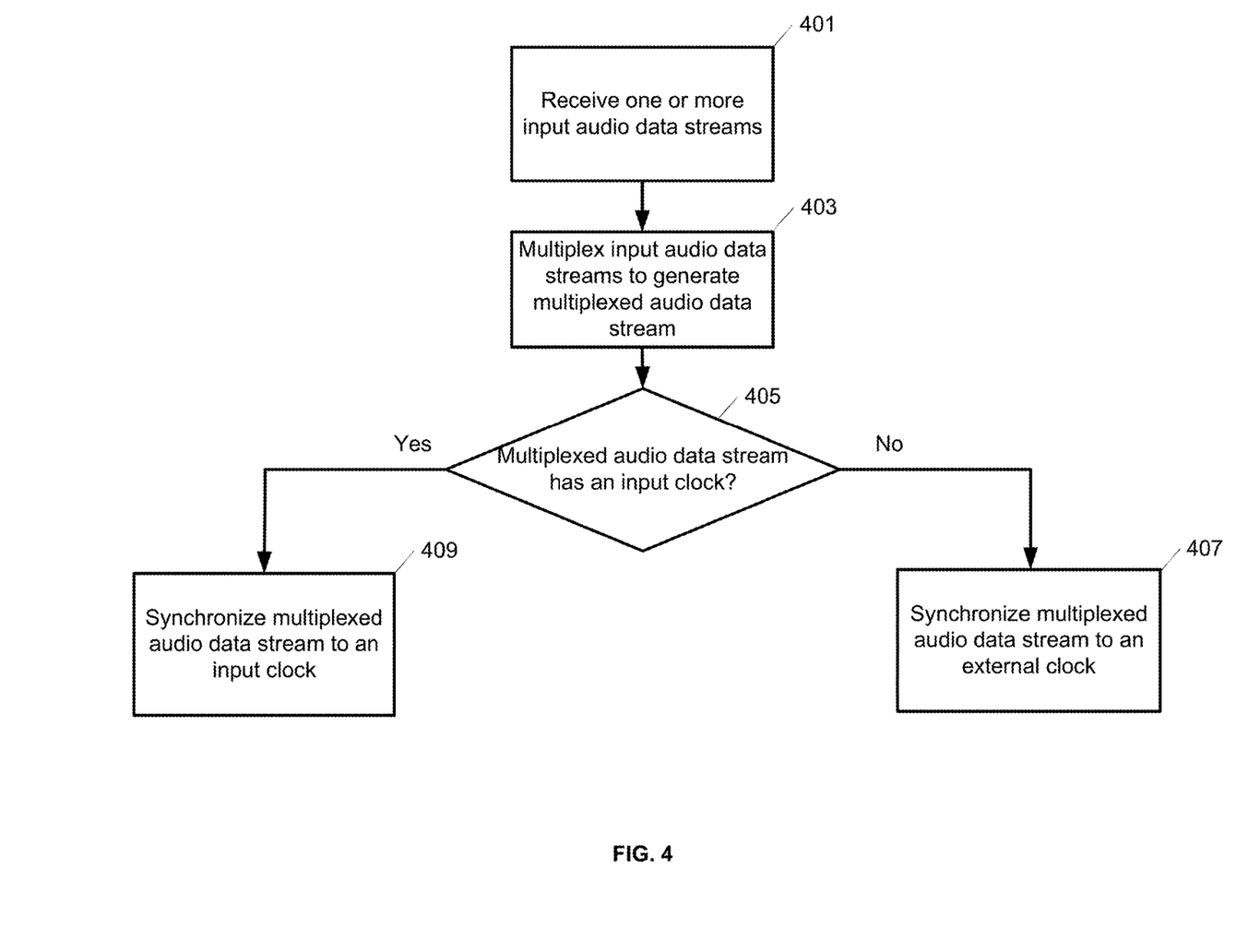
FIG. 4 is a flow diagram of a method of clock switching between an input sample clock of the audio data received over HDMI with eARC interface by a media device and an externally generated clock of the media device in accordance to one embodiment of the disclosure.

FIG. 4 is a flow diagram of a method of clock switching between an input sample clock of the audio data received over HDMI with eARC interface by a media device and an externally generated clock of the media device in accordance to one embodiment of the disclosure. The method may be practiced by the audio multiplexing module 121 of FIG. 1, 2, or 3.

At operation 401, the media device receives a plurality of input audio data streams 401 over the eARC interface. The input audio data streams 401 may be generated by different audio sources, may have different digital audio formats (e.g., SPIDF, I$^2$S signals), and may have different compression formats (e.g., MP3, AAC, Dolby Digital, DTS, or their lossless variants). The input audio data streams 401 may be received with their respective input sampling clocks.

At operation 403, the media device multiplexes the input audio data streams to generate a time multiplexed audio data stream. For example, the media device may multiplex between the input audio data streams when a user switches between the audio sources of the input audio data streams.

At operation 405, the media device determines if the time multiplexed audio data stream has a corresponding input clock. When switching between the input audio data streams, there may be a temporary loss or discontinuities in the corresponding input sampling clocks, resulting in discontinuities in the audio data when sampled.

At operation 407, if the time multiplexed audio data stream does not have a corresponding input sampling clock, the media device may substitute an externally generated clock derived from a local crystal oscillator for the missing input sampling clock. The externally generated clock may be synchronized to the frequency of the input sampling clock that corresponds to the time multiplexed audio data stream. When the input sampling clock disappears, the externally generated clock may continue to run at the frequency of the input sampling clock prior to its disappearance.

At operation 409, if the time multiplexed audio data stream has a corresponding input sampling clock, the audio data stream is synchronized to the corresponding input sampling clock.

Figure 5:
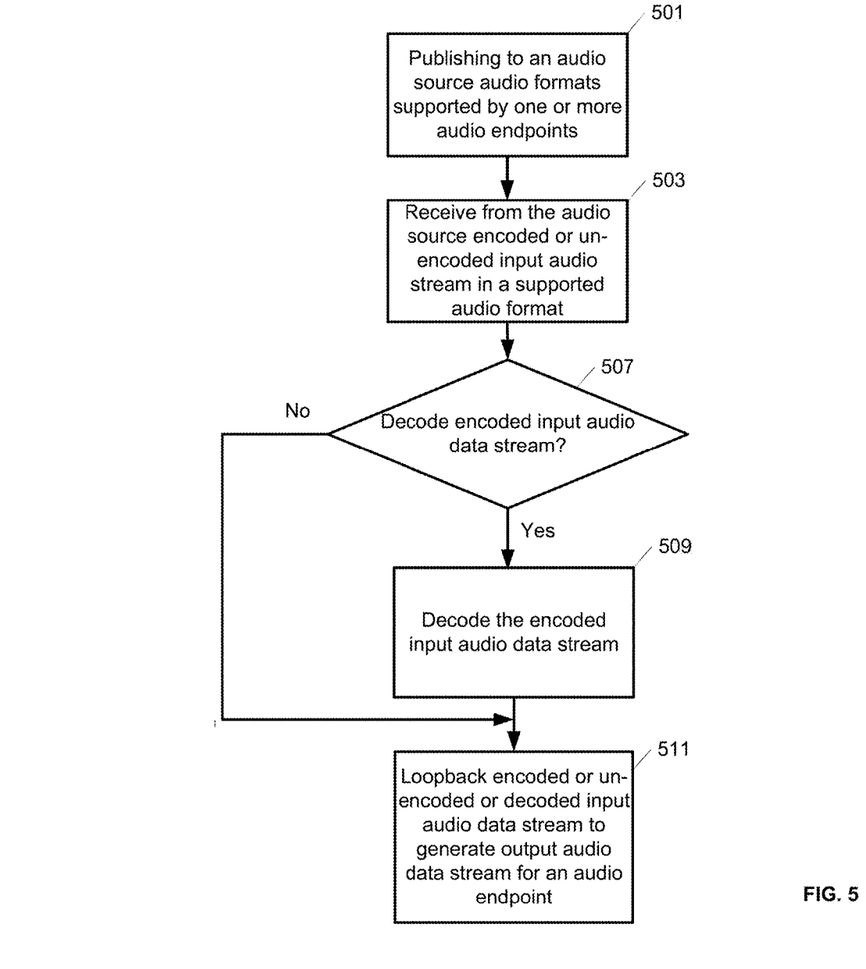
FIG. 5 is a flow diagram of a method of data decoding and loopback application of audio data received over HDMI with eARC interface in accordance to one embodiment of the disclosure.

FIG. 5 is a flow diagram of a method of data decoding and loopback application of audio data received over HDMI with eARC interface in accordance to one embodiment of the disclosure. The method may be practiced by the AV SoC 117 of FIG. 1 or the eARC audio service driver 163 and the loopback application 167 of FIG. 2 and FIG. 3

At operation 501, the method publishes to an audio source the audio formats supported by one or more audio endpoints or audio playback devices. In one embodiment, the audio playback devices may publish their supported audio formats to the audio source when the audio playback devices establish their connections with the audio source. In one embodiment, the supported audio formats may be compression formats such as MP3, AAC, Dolby Digital, DTS, or their lossless variants.

At operation 503, the method receives from the audio source an audio data stream. The data stream may be an encoded frame of audio data in a data format either supported or not supported by an audio playback device, or may be an un-encoded frame of audio data. In one embodiment, the method may inspect the header of the audio data frame to determine the data format of the frame.

At operation 507, the method determines whether to decode the audio data frame if it is encoded. In one embodiment, if the data format of the frame of encoded data is not supported by the audio playback device, the method may determine to decode the audio data frame. In one embodiment, if the data format of the frame of encoded data is supported by the audio playback device, the method may determine not to decode the audio data frame in a pass-through mode to allow the audio playback device to decode the frame. The pass-through mode may enable a reduction in the processing latency of the audio data from the audio source to the audio playback device.

At operation 509, if it is determined to decode the audio data frame, the method decodes the frame of encoded audio data in accordance with the determined data format. The decoded audio data may be in PCM format.

At operation 511, if it is determined not to decode the audio data frame or if the audio data frame has been decoded from operation 509, the method may loopback the audio data frame to generate an output audio data stream for the audio playback device. In one embodiment, the audio data frame may contain encoded audio data in a data format supported by the audio playback device in the pass-through mode. In one embodiment, the audio data frame may be an un-encoded frame of audio data or a decoded frame of audio data from operation 509. The method may encode the un-encoded frame or the decoded frame into a data format supported by the audio playback device.

Embodiments of the systems and methods for processing audio data received over the HDMI eARC or ARC interface described herein may be implemented in a data processing system, for example, by a network computer, network server, tablet computer, smartphone, laptop computer, desktop computer, other consumer electronic devices or other data processing systems. In particular, the operations described for processing the audio data are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions, which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

While certain exemplary instances have been described and shown in the accompanying drawings, it is to be understood that these are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicant wishes to note that it is not intended for any of the appended claims or claim elements to invoke 35 U.S.C. 112(f) unless the words "means for" or "step for" are explicitly used in the particular claim.

What is claimed is:

1. A method comprising:
receiving from an audio source an encoded input audio data stream containing encoded audio data;
determining whether to decode the encoded input audio data stream or to bypass decoding;
in response to determining to decode the encoded input audio data stream, decoding the encoded audio data to generate a decoded audio data stream containing decoded audio data and looping back the decoded audio data of the decoded audio data stream; and
in response to determining to bypass decoding, looping back the encoded audio data of the encoded input audio data stream encoded in one or more audio formats supported by one or more audio endpoints, wherein by looping back, the encoded input audio data stream or the decoded audio data stream is routed from the audio source to one of the audio endpoints, wherein the audio source and the one audio endpoint are on opposite sides or a same side of an Audio Return Channel (ARC) or an enhanced ARC (eARC) interface of a High-Definition Multimedia Interface (HDMI).

2. The method of claim 1, wherein determining whether to decode the encoded input audio data stream comprises determining whether a decoding latency associated with decoding the encoded audio data to generate the decoded audio data stream containing the decoded audio data yields an overall latency that meets a latency target, wherein the overall latency comprises a latency from receiving an encoded audio data of the input audio data stream to one of the audio endpoints playing a decoded audio data decoded from the encoded audio data.

3. The method of claim 1, further comprising synchronizing the output audio data by a clock associated with the encoded input audio data stream when the one or more output data streams contain the encoded audio data of the encoded input audio data stream.

4. The method of claim 1, further comprising:
transmitting the one or more output audio data streams to the one or more audio endpoints.

5. The method of claim 4, wherein determining whether to decode the encoded input audio data stream comprises determining one or more of capabilities of the one or more audio endpoints, the audio formats supported by the one or more audio endpoints, or a bandwidth used for transmitting the one or more output audio data streams to the one or more audio endpoints.

6. The method of claim 1, wherein looping back the decoded audio data of the decoded audio data stream to generate the one or more output audio data streams comprises:

encoding the decoded audio data of the decoded audio data stream into one or more audio formats supported by the one or more audio endpoints.

7. The method of claim 1, wherein the encoded input audio data stream comprises pulse coded modulated (PCM) audio data.

8. The method of claim 1, wherein the encoded input audio data stream is received from the ARC or the eARC interface of the HDMI.

9. The method of claim 1, wherein the audio formats supported by the one or more audio endpoints comprise audio formats supported by a Bluetooth audio endpoint or by a WiFi audio endpoint.

10. A system comprising:
a processor; and
a memory coupled to the processor to store instructions, which when executed by the processor, cause the processor to:
receive from an audio source an encoded input audio data stream containing encoded audio data;
determine whether to decode the encoded input audio data stream or to bypass decoding;
in response to a determination to decode the encoded input audio data stream, decode the encoded audio data to generate a decoded audio data stream containing decoded audio data and loop back the decoded audio data of the decoded audio data stream; and
in response to a determination to bypass decoding, loopback the encoded audio data of the encoded input audio data stream encoded in one or more audio formats supported by one or more audio endpoints, wherein by the loopback, the encoded input audio data stream or the decoded audio data stream is routed from the audio source to one of the audio endpoints, wherein the audio source and the one audio endpoint are on opposite sides or a same side of an Audio Return Channel (ARC) or an enhanced ARC (eARC) interface of a High-Definition Multimedia Interface (HDMI).

11. The system of claim 10, wherein to determine whether to decode the encoded input audio data stream, the processor executes the instructions stored in the memory to:
determine whether a decoding latency associated with decoding the encoded audio data to generate the decoded audio data stream containing the decoded audio data yields an overall latency that meets a latency target, wherein the overall latency comprises a latency from receiving an encoded audio data of the input audio data stream to one of the audio endpoints playing a decoded audio data decoded from the encoded audio data.

12. The system of claim 10, wherein the processor further executes the instructions stored in the memory to:
synchronize the output audio data by a clock associated with the encoded input audio data stream when the one or more output data streams contain the encoded audio data of the encoded input audio data stream.

13. The system of claim 10, wherein the processor further executes the instructions stored in the memory to:
transmit the one or more output audio data streams to the one or more audio endpoints.

14. The system of claim 13, wherein to determine whether to decode the encoded input audio data stream, the processor executes the instructions stored in the memory to:
determine one or more of capabilities of the one or more audio endpoints, the audio formats supported by the one or more audio endpoints, or a bandwidth used to transmit the one or more output audio data streams to the one or more audio endpoints.

15. The system of claim 10, wherein to loopback the decoded audio data of the decoded audio data stream to generate the one or more output audio data streams, the processor further executes the instructions stored in the memory to:
encode the decoded audio data of the decoded audio data stream into one or more audio formats supported by the one or more audio endpoints.

16. The system of claim 10, wherein the encoded input audio data stream comprises pulse coded modulated (PCM) audio data.

17. The system of claim 10, wherein the encoded input audio data stream is received from the ARC or the eARC interface of the HDMI.

18. The system of claim 10, wherein the audio formats supported by the one or more audio endpoints comprise audio formats supported by a Bluetooth audio endpoint or by a WiFi audio endpoint.

19. A non-transitory computer-readable medium having instructions stored therein, which when executed by a processor, cause the processor to perform operations, the operations comprising:
receiving from an audio source an encoded input audio data stream containing encoded audio data;
determining whether to decode the encoded input audio data stream or to bypass decoding;
in response to determining to decode the encoded input audio data stream, decoding the encoded audio data to generate a decoded audio data stream containing decoded audio data and looping back the decoded audio data of the decoded audio data stream; and
in response to determining to bypass decoding, looping back the encoded audio data of the encoded input audio data stream encoded in one or more audio formats supported by one or more audio endpoints, wherein by looping back, the encoded input audio data stream or the decoded audio data stream is routed from the audio source to one of the audio endpoints, wherein the audio source and the one audio endpoint are on opposite sides or a same side of an Audio Return Channel (ARC) or an enhanced ARC (eARC) interface of a High-Definition Multimedia Interface (HDMI).

20. The non-transitory computer-readable medium of claim 19, wherein looping back the decoded audio data of the decoded audio data stream to generate the one or more output audio data streams comprises:
encoding the decoded audio data of the decoded audio data stream into one or more audio formats supported by the one or more audio endpoints.

* * * * *